United States Patent [19]
Siwersson et al.

[11] 3,990,567
[45] Nov. 9, 1976

[54] SHIP UNLOADING APPARATUS

[75] Inventors: Olle Lennart Siwersson; Karl Gunnar Tell, both of Helsingborg, Sweden

[73] Assignee: AB Scaniainventor, Helsingborg, Sweden

[22] Filed: Nov. 5, 1974

[21] Appl. No.: 521,192

Related U.S. Application Data

[63] Continuation-in-part of Ser. No. 333,452, Feb. 20, 1973, abandoned.

[30] Foreign Application Priority Data

Feb. 24, 1972 Sweden.................... 2285/72

[52] U.S. Cl................. 198/518; 198/592; 214/14; 198/611
[51] Int. Cl.²......................................... B65G 37/00
[58] Field of Search............... 214/14, 15 D, 15 E, 214/10; 198/36, 102, 88, 9, 91, 90, 93, 104, 77

[56] References Cited
UNITED STATES PATENTS 3,524,510  8/1970  Connell................. 198/104
3,616,890  11/1971  Pradon.................. 214/10

FOREIGN PATENTS OR APPLICATIONS 1,394,529  2/1965  France................... 214/14
577,034  5/1933  Germany................ 214/14
2,123,249  11/1972  Germany................ 214/14
1,014,030  8/1957  Germany................ 214/14
116,705  5/1969  Norway
537,977  7/1941  United Kingdom..... 214/14

Primary Examiner—Robert J. Spar
Assistant Examiner—Ross Weaver
Attorney, Agent, or Firm—Karl W. Flocks

[57] ABSTRACT

This invention relates to an apparatus for continuous unloading of dry loose particulate material from especially ships. The apparatus provides continuous conveyance of paticulate materials through an entirely closed system whereby air pollution, spillage, irregular unloading and sensitivity to weather conditions are eliminated or highly reduced.

6 Claims, 8 Drawing Figures

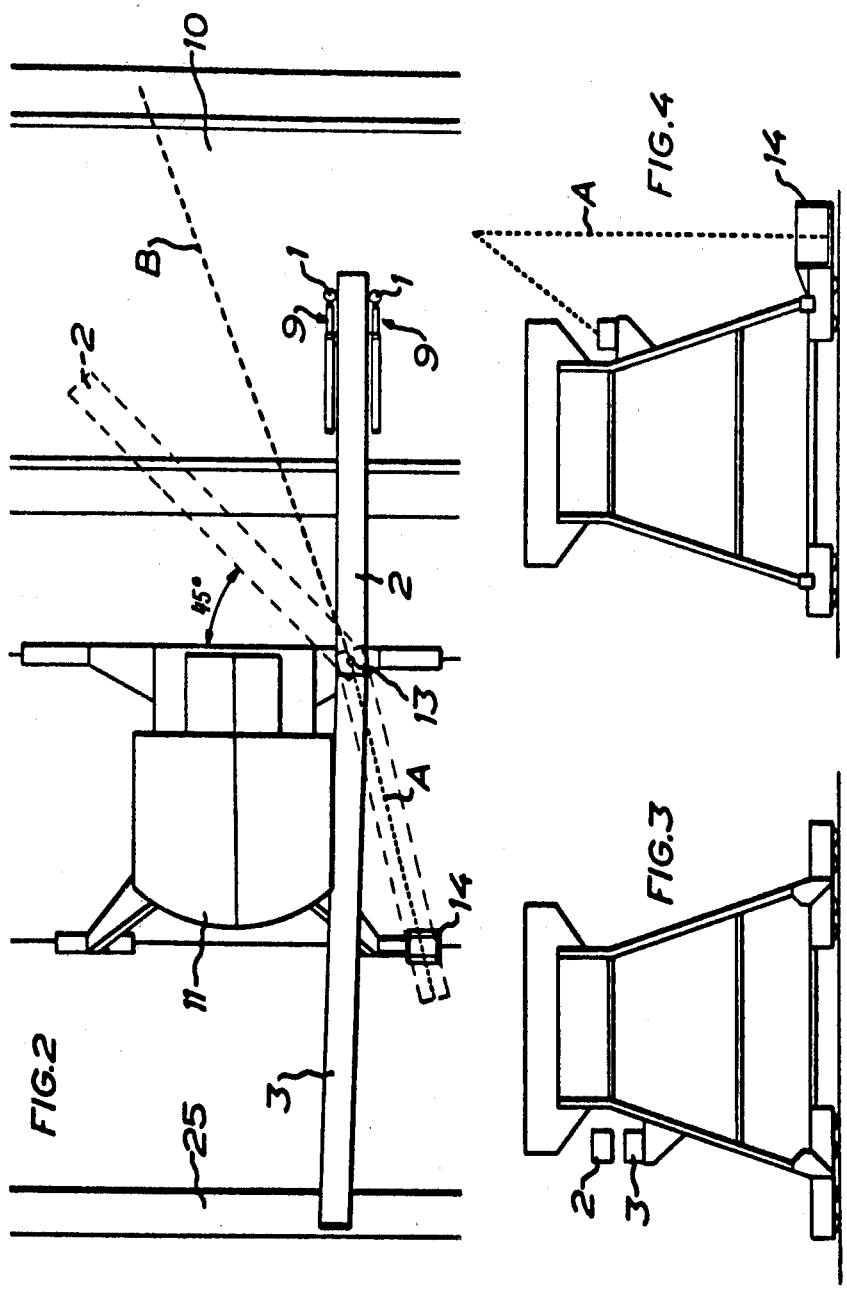

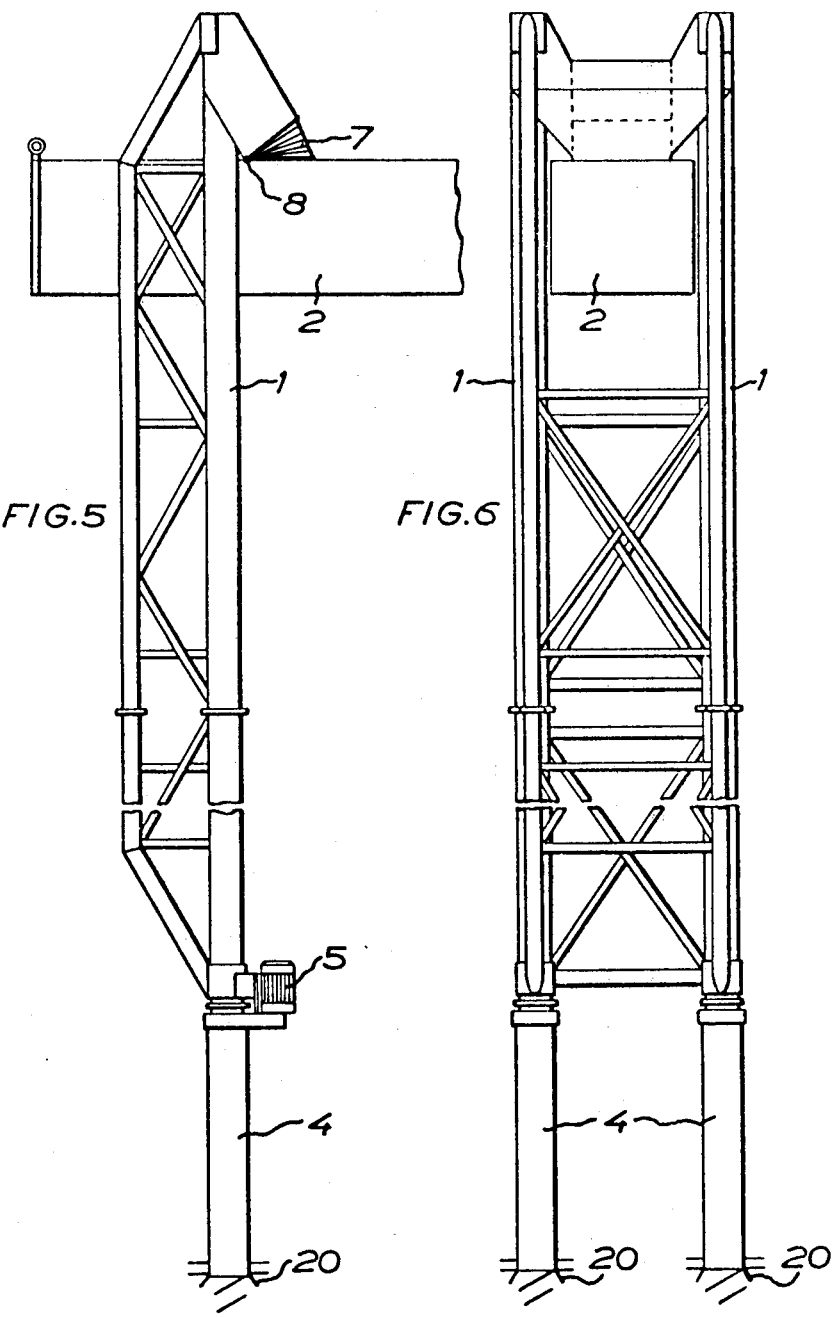

SHIP UNLOADING APPARATUS

This is a continuation-in-part of copending application Ser. No. 333,452 filed Feb. 20, 1973, now abandoned.

BACKGROUND OF THE INVENTION

To unload ships carrying bulk cargo in the form of various particulate materials by conventional methods, for instance with the use of grab buckets, involves several disadvantages, int.al. air pollution, spillage of material onto the quay and into the water, irregular unloading rate, sensitivity to poor weather conditions etc. With pneumatic apparatuses difficulties are encountered in unloading particulate goods of specific character and in separating the good conveyed from the air after conveyance.

Systems have attempted to use a vertical screw conveyor but such conveyors in the past had extremely low capacity. The only screw conveyor having a capacity profitable for the unloading of bulk cargoes from ships (where capacities of 500 tons/hour and more are desired) is the type of screw conveyor proposed by the present inventors, i.e. a conveyor equipped with the patented feed device according to especially U.S. Pat. No. 3,596,751 issued Aug. 3, 1971 (but also according to U.S. Pat. No. 3,685,638 issued Aug. 22, 1972).

For a device of this type to be commercially profitable for the unloading of modern bulk cargo ships, it must have a capacity of several hundred tons per hour, preferably 500 tons/hour and more per unit. This can be achieved with large bucket elevators, but these suffer from the disadvantage of being heavy and clumsy. Furthermore, they are unable to reach all points of the cargo hold, and thus large quantities of the cargo are left in the hold. They are therefore unprofitable and cause considerably technical difficulties.

A conventional screw conveyor in vertical position is entirely useless for most materials (zero capacity). Such screw conveyors have been designed only for grain and cement, but their capacities are extremely limited, and they have not found any use in actual practice. On the other hand, a screw conveyor equipped with a feed device according to the above-mentioned U.S. Patents can handle quantities per hour that lie from 10 to 25 times higher than those obtainable with conventional screw conveyors for grain. For other goods, the comparison will be still more favorable.

In certain underdeveloped countries (for instance India) conventional vertical screw conveyors according to the above mentioned U.S. Patents are being employed without the devices referred to in the present application, but this means foregoing a number of advantages, and in the highly efficient ports in Europe and the United States, these simple devices cannot compete with other types. The capacity will therefore be lower, and above all there is no possibility of maneuvering the conveyors inside the cargo hold. If one wishes to increase the capacity, the conveyor will be so large and heavy that it cannot possibly be handled without the remaining elements referred to herein and, besides, a tearing means described herein would not be able to function.

SUMMARY OF THE INVENTION

This invention has for its object to overcome or reduce these disadvantages. To this end, the invention provides an apparatus for continuous unloading of dry loose particulate materials from especially ships, comprising a vertical conveyor having a lower feed device and formed as a screw conveyor, and a horizontal conveyor cooperating with and connected to the vertical conveyor which is so arranged as to permit being swung outwardly from its vertical position and also being raised and lowered, the horizontal conveyor being swingably mounted in such a way that the feed end thereof, which cooperates with and is connected to the vertical conveyor, is raisable and lowerable and movable back and forth on an arc with its center spaced from the feed end of the horizontal conveyor.

Conveyance takes place continuously in a manner similar to the conveyance through a pump, and the system is entirely closed so that air pollution is prevented. This in turn imples that the system is independent of weather conditions since the hatchway can be covered with tarpaulins while unloading is in progress.

The present invention as described possesses a number of highly important features which do not exist in any prior art devices.

These features are:

a. a commercially profitable and sufficiently large unloading capacity by a continuous and dust-free method which can be used not only for grain and cement, but for practically all bulk goods, also coal (not above a particle size 2 inches);

b. the invention makes it possible to move a screw conveyor of the above described type in a pendulum pattern over the bulk cargo in the hold so that a high and uniform unloading capacity can be maintained practically at all times. Such movements for non-flowing bulk material are absolutely necessary in order to achieve a high capacity. All other unloading devices described by the prior art merely dig a hole in a non-flowing cargo so that a number of workers must be sent down into the hold for shovelling up material to a suction device;

c. the invention makes it possible to dig and tear loose solid material in the hold. This is extremely important since the cargo during the voyage usually is packed into a hard mass. Without a hydraulic jack and without the movements performed by the device according to the invention, this would not be possible.

BRIEF DESCRIPTION OF THE DRAWINGS

The apparatus will be more fully described hereinbelow with reference to the accompanying drawings in which:

FIG. 2 illustrates the arrangement in FIG. 1 in plan view and in section on line II—II in FIG. 1;

FIG. 3 is a view on line III—III in FIG. 1;

FIG. 4 is a view on line IV—IV in FIG. 1;

FIG. 5 illustrates on a larger scale and in side view the vertical conveyor of the apparatus shown in FIGS. 1 and 2;

FIG. 6 illustrates the vertical conveyor as viewed from the left in FIG. 5;

DESCRIPTION OF THE PREFERRED EMBODIMENTS

Figure 1:
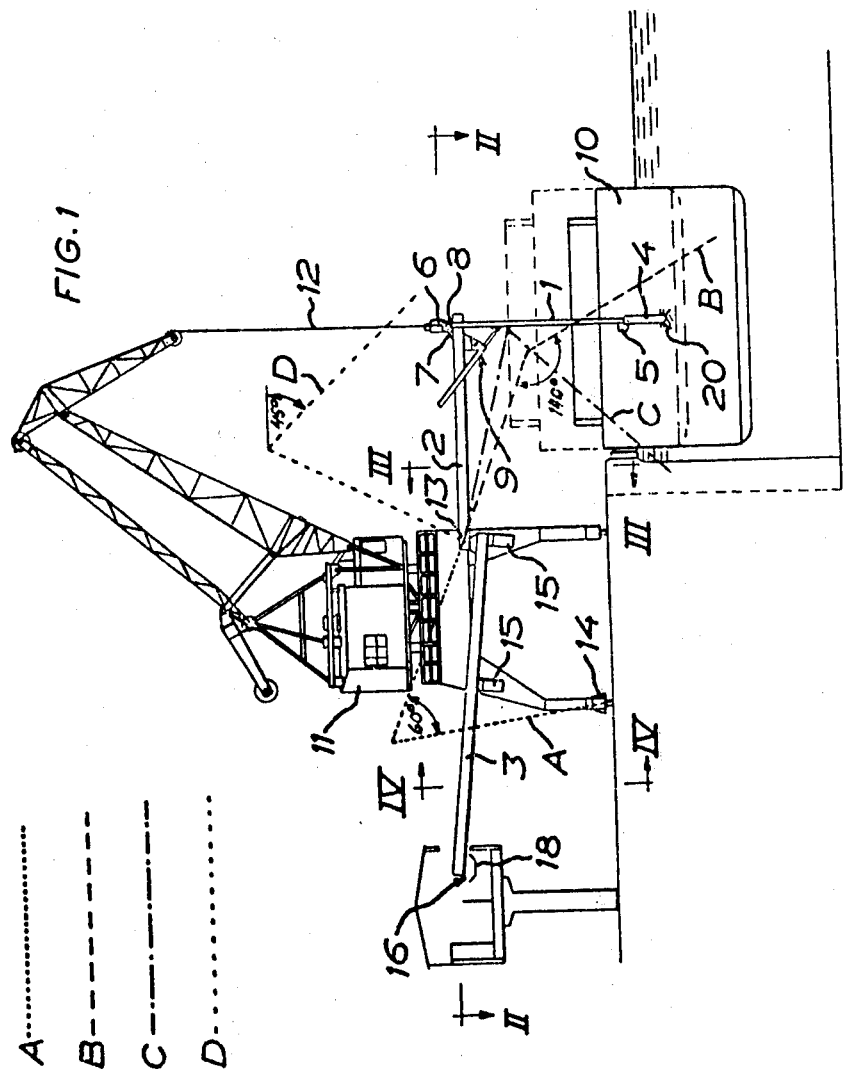
FIG. 1 illustrates, in an embodiment, chosen by way of example, of a system constructed in accordance with the invention and associated with a standard luffing jib crane, the vertical cross-section of the unloading ship, quay, crane and roofed conveyor belt travelling along the quay.

FIGS. 1 to 6 illustrate by way of example how to mount the unloading apparatus on a luffing jib crane. Alternatively, the apparatus can of course be connected to another type of crane or, for instance, a hydraulic mechanism for retaining and operating the component parts.

The apparatus illustrated in FIGS. 1 to 6 comprises three main components, viz. two vertical screw conveyors 1 connected in parallel and each provided with one feed device 4 (for instance according to Swedish Pat. No. 322,161) and a covered (dust-sealed) horizontal conveyor 2 movable laterally and vertically (for instance of the belt, scraper or screw type) and a covered horizontal conveyor 3 movable longitudinally and opening into an optional device, e.g. a conveyor belt 18 travelling along the quay. The basic feature of the system is the vertical screw conveyor 1 with the associated feed device 4 and separate prime mover or drive 5. The outer part of the feed device may be equipped with removable tearing means 17 which is diagrammatically shown in FIG. 7 only. The tearing means 17 may be formed for instance as a rotary milling cutter which serves to tear loose material that would not otherwise come loose and get within the reach of the feed device 4. When in the form of a milling cutter, the rotary tearing means may comprise a cylinder which can be caused to rotate about the conduit of the vertical conveyor 1 and which is detachably mounted for instance in the form of two semi-cylindrical cups about the feed device 4 and has on its outer side tearing pins 19 protruding outside the lower guide vanes 20 of the feed device 4.

In FIGS. 1 to 6 the vertical conveyor comprises two vertical screw conveyors 1, but use could of course also be made of a single screw conveyor. Each screw conveyor 1 is driven by an either electric or hydraulic motor 6. In hydraulic operation the rpm of the feed device 4 can be varied in dependence on the load of the drive motors 6 of the conveyor screws.

To safeguard dust proofness the outlets of the screw conveyors 1 are connected to the covered horizontal conveyor 2 by bellows or cup leathers 7. The screw conveyors 1 are pivotally suspended in the horizontal conveyor 2 (cf. FIG. 1), the center of pivotment being designated 8. The screw conveyor unit 1 may be suspended for instance in a crane 11 by means of a wire rope 12 so as to permit being operated in vertical and lateral sense. Alternatively, this operation may be performed hydraulically.

In other respect the screw conveyor unit 1 may be operated according to the following two alternatives.

Alternative I: In FIG. 1 the vertical conveyor unit 1 is operated like a pendulum by hydraulic piston and cylinder units 9, and the screw conveyor unit 1 can occupy two extreme positions, one outer position and one inner position, respectively. The dash lines B and C in FIG. 1 indicate these positions which are necessary in order to get at the cargo in different parts of the cargo hold 10 of the ship. The crane 11 or corresponding assembly which can travel on a track along the quay, and the horizontal conveyor 2 which in addition is laterally swingable (as is indicated by dash lines in FIG. 2) provide good possibilities of realizing a flexible unloading procedure.

A control box (not shown) including a system for intercommunication with the crane operator and electric power connection cable is provided for operating, starting and stopping the unloading apparatus. Control is meant to be carried out by an attendant stationed at the hatch coaming.

Figure 7:
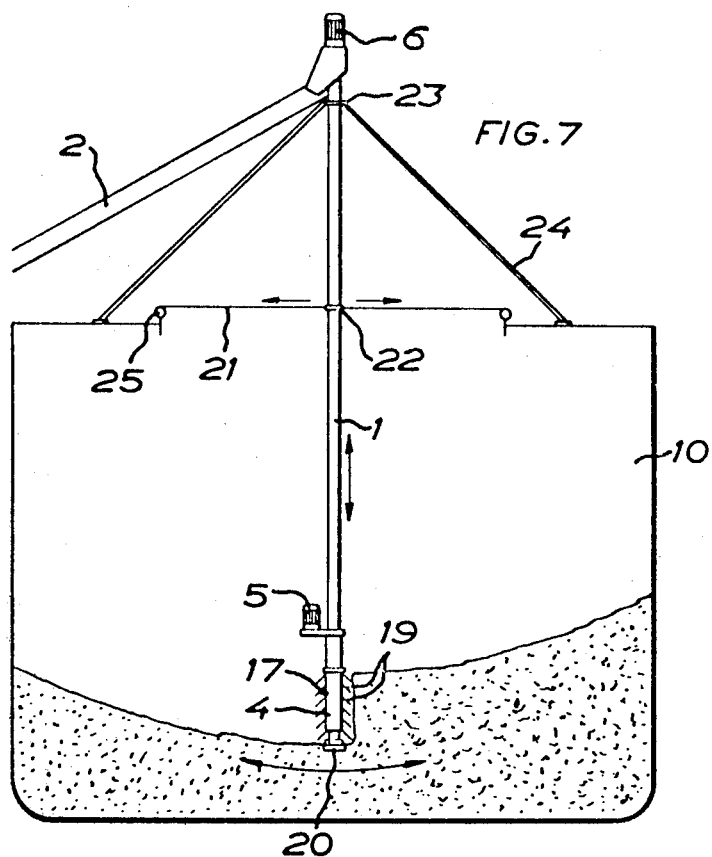
FIG. 7 is a diagrammatic section of an unloading ship with an alternative embodiment of the unloading apparatus placed on the ship's deck.
Figure 8:
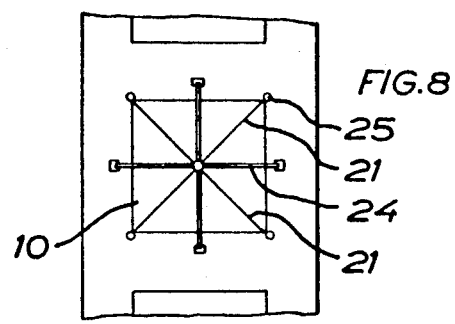
FIG. 8 is a plan view on a smaller scale of the unloading apparatus shown in FIG. 7.

Alternative II: Operation realized by means of winches and wire ropes in conformity with the embodiment illustrated in FIGS. 7 and 8. The vertical conveyor unit 1 may alternatively be equipped with means for moving it laterally, i.e. effecting movements like a pendulum. In doing so, it is possible, as is shown in FIGS. 7 and 8, to use winches 25 with crossed wire ropes 21 and a ring member 22 around the vertical conveyor 1 in order that the latter may be moved horizontally by means of the ring member 22 so that the vertical conveyor will swing about a point determined by a ring 23 which is carried by trestles 24 placed on the ship's deck. Moreover, the vertical conveyor 1 is raisable and lowerable, as is indicated by a double arrow in FIG. 7. A control box with contactors (not shown) permits operation of the winches by means of a lever which is movable in two directions whereby the lowermost end of the vertical conveyor can be moved to desired locations (FIG. 7).

The screw conveyor or conveyors of the vertical conveyor unit 1 with associated feed device 4 are provided at the lower ends with a safety coupling on the screw shaft to prevent damaging the conveyor screw when foreign matter in the cargo possibly enters said screw. Said safety coupling comprises a device situated about 500 mm above the screw end, which disengages the lower screw part when a predetermined load is exceeded. The lower end of the screw shaft has been formed as a ferrule to avoid damage to it when it is driven down to the bottom of the cargo hold. The feed device 4 is equipped with safety rings.

In both embodiments illustrated in the drawings the horizontal conveyor 2 is entirely covered (encased) with sheet metal, plastics or other suitable material to avoid air pollution by dusting or whirling of the material conveyed. The horizontal conveyor has fastening devices for the vertical conveyor unit 1 (at 8, FIGS. 1 and 5) and fastenings for operating cylinders 9.

The horizontal conveyor illustrated in FIGS. 1 to 6 is pivoted to a further horizontal conveyor 3 at 13, and in addition to lateral swinging movement according to FIG. 2 the horizontal conveyor 2 can be moved also vertically by the action of the crane 11 and the wire rope 12 or corresponding hydraulic mechanism. Note also the marking lines A–D in FIGS. 1 and 2. The horizontal conveyor 2 as well as the vertical conveyor unit 1 can be turned to a position of rest as shown by dot lines A in FIGS. 1 and 2, the screw conveyor unit 1 being placed in a particular stand 14 at one foot or corresponding part of the gantry of the crane. In this rest position the conveyors will not obstruct the operating functions of the crane for other use, and the loading gauge will not be encroached upon. Certain safety devices, such as rubber fenders, warning lights and warning sound signals, etc. are incorporated in the apparatus.

The horizontal conveyor 3 is of covered dust-proof design and may be of optional length to fit occurring requirements and ancillary equipment. It should, as a rule, be constructed so as to be displaceable in its longitudinal direction to permit travel of the crane 11 when the unloading apparatus is not in use. Displacement is carried out for instance with a simple hand winch. The horizontal conveyor 3 is fastened to the gantry of the crane 11 with fastenings 15. The material conveyed is discharged from the horizontal conveyor 3 at a discharge station 16 which incorporates a suitable seal with respect to the conveyor 18, silo or stock. To avoid trouble when the ships are maneuvered along the quay the horizontal conveyor 3 in its operative position should not protrude outside the profile of the luffing jib crane on the side facing the sea. This is avoided by mounting and fastening the apparatus in the manner illustrated in FIGS. 1 to 4. The horizontal conveyor 3 is arranged to be flushed when cleaned (for instance with water).

The terms "vertical and horizontal conveyors" as used herein apply to a conveyor for vertical conveyance and horizontal conveyance, respectively, and must not be considered to exclude an inclination from the vertical and the horizontal, respectively.

What is claimed is:

1. Apparatus for the continuous conveyance of a particulate material, comprising:
   a tubular vertical screw conveyor having an open lower end for inflow of the particulate material into said vertical screw conveyor;
   means for feeding the particulate material to said open end;
   said feeding means comprising a cylinder co-axial with the screw conveyor, means for rotating said cylinder about its axis, and means projecting from the exterior of said cylinder for engaging the particulate material;
   a horizontal conveyor connected at one end thereof to the upper end of said vertical conveyor for receiving the particulate material therefrom;
   said vertical and horizontal conveyors being enclosed along their lengths for preventing discharge of dust therefrom;
   a flexible covering between said ends of said vertical and horizontal conveyors for preventing discharge of dust therefrom;
   said vertical conveyor being swingable in any radial direction from the vertical relative to said horizontal conveyor; and
   said horizontal conveyor being movable to raise and lower said one end thereof and to displace said one end thereof on an arc having its center spaced from said one end; and
   means for effecting the swinging of said vertical conveyor and the movement of said horizontal conveyor.

2. Apparatus as claimed in claim 1, wherein said horizontal conveyor is arranged so as to permit being swung about the other end thereof.

3. Apparatus as claimed in claim 2, wherein said moving means includes a crane having a gantry, said other end of said horizontal conveyor being swingably connected to said gantry of said crane, and the connected ends of said horizontal and vertical conveyors having crane hook fastening means to permit controlling the height and lateral positions of said connected ends by means of said crane.

4. Apparatus as claimed in claim 3, wherein said crane is a luffing jib crane.

5. Apparatus as claimed in claim 1, wherein the other end of said horizontal conveyor is connected to a further horizontal conveyor which preferably is movable in its longitudinal direction.

6. Apparatus as claimed in claim 1, wherein said vertical conveyor is raisable and lowerable and swingably supported by trestle means with a ring fastened therein, loosely embracing said vertical conveyor and forming a point about which the vertical conveyor can swing, and a movable ring member also loosely embracing said vertical conveyor connected to crossing wire ropes of winches, with the aid of which wire ropes the horizontal position of said movable ring member is adjustable.

* * * * *